(12) United States Patent
Liu et al.

(10) Patent No.: US 11,392,376 B2
(45) Date of Patent: Jul. 19, 2022

(54) PROCESSOR FOR SPARSE MATRIX COMPUTATION

(71) Applicant: Arm Limited, Cambridge (GB)

(72) Inventors: Zhigang Liu, Westford, MA (US); Matthew Mattina, Boylston, MA (US); Paul Nicholas Whatmough, Cambridge, MA (US); Jesse Garrett Beu, Austin, TX (US)

(73) Assignee: Arm Limited, Cambridge (GB)

( * ) Notice: Subject to any disclaimer, the term of this patent is extended or adjusted under 35 U.S.C. 154(b) by 657 days.

(21) Appl. No.: 16/381,349

(22) Filed: Apr. 11, 2019

(65) Prior Publication Data
US 2020/0326938 A1   Oct. 15, 2020

(51) Int. Cl.
G06F 9/30 (2018.01)
G06F 9/38 (2018.01)
G06F 17/16 (2006.01)

(52) U.S. Cl.
CPC .......... G06F 9/3001 (2013.01); G06F 9/3887 (2013.01); G06F 17/16 (2013.01)

(58) Field of Classification Search
CPC ..... G06F 9/3001; G06F 17/16; G06F 9/30036
USPC ....................................................... 708/607
See application file for complete search history.

(56) References Cited

U.S. PATENT DOCUMENTS

| | | |
|---|---|---|
| 2019/0042542 A1 | 2/2019 | Narayanamoorthy et al. |
| 2019/0065150 A1* | 2/2019 | Heddes .................. G06N 3/082 |
| 2021/0035258 A1* | 2/2021 | Ray ..................... G06F 12/0806 |

OTHER PUBLICATIONS

Buluç, Aydin; Fineman, Jeremy T.; Frigo, Matteo; Gilbert, John R.; Leiserson, Charles E., "Parallel sparse matrix-vector and matrix-transpose-vector multiplication using compressed sparse blocks", ACM Symp. on Parallelism in Algorithms and Architectures. CiteSeerX 10.1.1.211.5256, 2009.
Chen et al., "Eyeriss: A Spatial Architecture for Energy-Efficient Dataflow for Convolutional Neural Networks", ISCA'17, https://people.csail.mit.edu/emer/papers/2016.06.isca.eyeriss_architecture.pdf.
Jouppi et al., "In-Datacenter Performance Analysis of a Tensor Processing Unit", ISCA'17, https://arxiv.org/pdf/1704.04760.pdf.
Moons et al., "A 0.3-2.6 TOPS/W precision-scalable processor for real-time large-scale ConvNets", VLSI'17, https://arxiv.org/pdf/1606.05094.pdf.

(Continued)

Primary Examiner — Tan V Mai
(74) Attorney, Agent, or Firm — Leveque Intellectual Property Law, P.C.

(57) ABSTRACT

A data processor receives a first set of processor instructions for combining a first matrix with a second matrix to produce a third matrix and generates a second set of processor instructions therefrom by identifying values of non-zero elements of the first matrix stored in a memory of the data processor and determining memory locations of elements of the second matrix. An instruction of the second set of processor instructions includes a determined memory location and/or an explicit value of an identified non-zero element. The second set of processor instructions is executed by the data processor. The second set of processor instructions may be generated by just-in-time compilation of the first set of processor instructions and may include instructions of a custom instruction set architecture.

23 Claims, 6 Drawing Sheets

(56) References Cited

OTHER PUBLICATIONS

Parashar et al., "SCNN: An Accelerator for Compressed-sparse Convolutional Neural Networks", ISCA 2017, http://people.csail.mit.edu/anurag_m/papers/2017.scnn.isca.pdf.

A. Morad, L. Yavits and R. Ginosar, "Efficient Dense and Sparse Matrix Multiplication on GP-SIMD," 2014 24th International Workshop on Power and Timing Modeling, Optimization and Simulation (PATMOS), Palma de Mallorca, 2014, pp. 1-8.

* cited by examiner

```
408
VLDR.8 D_4, [X_0, 0];        # load first row of B
VMOV.8  D_0, 1;              # assign immediate value 1 to register
VMUL    D_8, D_0, D_4        # first product VLDR.8 D_7, [X_0, 12];       # load last row of B
VMOV.8  D_2, 2;              # assign immediate value 2 to register
VMLA    D_8, D_1, D_7        # add second product VSTR [X_1, 0], D_8;          # save result to C at address X_1+0
```

PROCESSOR FOR SPARSE MATRIX COMPUTATION

BACKGROUND

Matrix multiplication is a fundamental operation for many important applications, including neural networks and machine learning. When performed using a data processor, it is advantageous that the processor is capable of performing the operation efficiently, and many processors are optimized to perform general purpose matrix multiplication.

However, often at least one of the matrices in question is sparse, meaning that a significant fraction of elements are zero. in such situations, a general-purpose multiplication is inefficient, since many elements will be multiplied by zero. The number of multiplications may be reduced by checking for non-zero elements in the sparse matrix before the elements are multiplied. However, the check itself consumes processing resources.

For example, convolutional neural networks (CNNs) are used for implementing tasks such as image classification. A common approach to implementing the convolutional layers in neural networks on data processor is to convert the convolution into a generic matrix multiplication (GEMM) operation. Optimized software libraries are used to execute the matrix multiplication efficiently on the data processor. In modern neural networks, these matrix multiplications consume significant cycles owing to the large number of multiplications required. For instance, the state-of-the-art Inception CNN for image recognition requires three billion operations per input frame. Recent research into neural networks has indicted that many of these matrices are sparse. If these "multiply by zero" operations can be avoided, the computation and power requirements are reduced. Various encodings have been proposed to reduce the memory and computation requirements of sparse matrices. The drawback of these approaches is that accessing the individual elements becomes more complex and introduces significant overhead on the processor. In practice, this results in these sparse encodings being useful only for extremely high levels of sparsity (e.g., >98% zeros).

Accordingly, there is a need for a data processor that performs efficient matrix computations when at least one of the matrices involved in the computation is sparse.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide systems, apparatus and methods for efficient computation of matrix computations, such as matrix multiplications, when at least one of the matrices involved in the computation is sparse.

While this disclosure is susceptible of embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

As used herein, the term processor, controller or the like may encompass a processor, controller, microcontroller unit (MCU), microprocessor, and other suitable control elements. It will be appreciated that embodiments of the disclosure described herein may be comprised of one or more conventional processors and unique stored program instructions that control the one or more processors to implement, in conjunction with certain non-processor circuits, some, most, or all of the functions described herein. The non-processor circuits may include, but are not limited to, peripheral devices, signal drivers, clock circuits, power source circuits, input and output devices and user input devices. As such, these functions may be interpreted as a method to perform functions in accordance with certain embodiments consistent with the present disclosure. Alternatively, some or all functions could be implemented by a state machine that has no stored program instructions, or in one or more application specific integrated circuits (ASICs), in which each function or some combinations of certain of the functions are implemented as custom logic. Still further, some or all of the functions could be implemented in an instruction set architecture (ISA) of a processor. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

A novel approach to computation of matrices is disclosed that is efficient when at least one of the matrices involved in the computation has a degree of sparsity. Such matrices are commonly found in the implementation of artificial neural networks, for example, where multiple sets of input data, representing input features, is multiplied by a sparse matrix of weights.

Herein, the term 'matrix' is taken to include data structures of any number of dimensions, including vectors, two-dimensional arrays and matrices with more than two dimensions. The disclosure below refers to 2-dimensional matrices, but it will be apparent to those of ordinary skill in the art that the approach may be applied to matrices with higher (or lower) dimension. Further, while the innovation is described with respect to matrix multiplication, it also has application to other operations between matrices where at least one of the matrices has a degree of sparsity.

Figure 1:
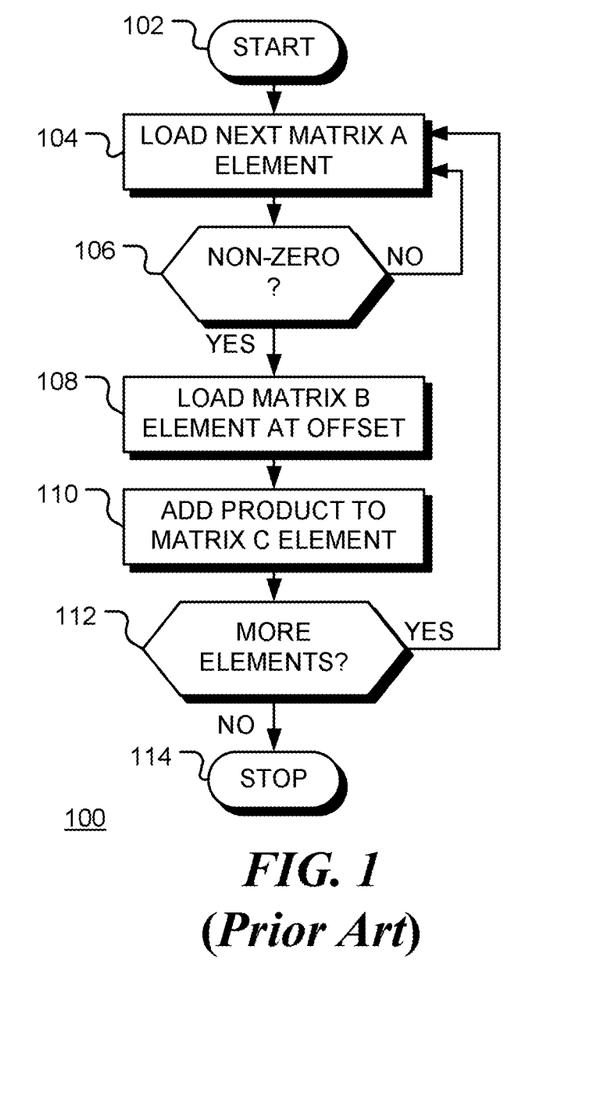
FIG. 1 is a flow chart of a method of sparse matrix multiplication in the prior art.

FIG. 1 is a flow chart of a method of sparse matrix multiplication in the prior art. Element i,k of a matrix C (with dimension $N_i \times N_k$) resulting from a product of matrix A (with dimension $N_i \times N_j$) and matrix B (with dimension $N_j \times N_k$) is in general computed as $$C_{ik} = \sum_{j=0}^{N_j-1} A_{ij} B_{jk}. \qquad (1)$$

When the matrix A is sparse, some of elements of A are zero, so the product can be computed as $$C_{ik} = \sum_{\substack{j=0, \\ A_{ij} \neq 0}}^{N_j-1} A_{ij} B_{jk}. \qquad (2)$$

This requires fewer multiply/accumulate instructions. However, the test $A_{ij} \neq 0$, to find non-zero element of the matrix A, requires processor resources. Flow chart 100 in FIG. 1 depicts computation of one element of the matrix C. Following start block 102, an element ($A_{ij}$) of the sparse matrix A is retrieved from memory at block 104. At decision block 106, the element is tested to see if it is non-zero. If the element is not non-zero, as depicted by the negative branch from decision block 106, flow returns to block 104. If the element is non-zero, as depicted by the positive branch from decision block 106, the corresponding element from the matrix B is loaded from memory at block 108. The two elements are multiplied and accumulated at block 110. If the computation is not complete, as depicted by the positive branch from decision block 112, the next element of the matrix A is loaded at block 104. Otherwise, as depicted by the negative branch from decision block 112, the method terminates at block 114. Conversely, if the element of matrix A is zero, as depicted by the negative branch from decision block 106, flow returns to block 104. Thus, computation is reduced since blocks 108 and 110 are avoided for zero elements of matrix A. However, this computation saving is offset by the inclusion of test 106 which must be performed for all elements.

In accordance with an embodiment of the present disclosure, code is generated automatically for a specific sparse matrix to be multiplied. The automatically generated code is specific to the non-zero values of data in the sparse matrix and the positions of those values. The code is generated in a first stage of processing, which may be implemented at runtime using "just in time" (JIT) code generation. The first stage of processing may be considered as a data-dependent compilation, that is, a compilation that depends both on the matrix operation to be executed and at least some of the data used in that operation.

Figure 2:
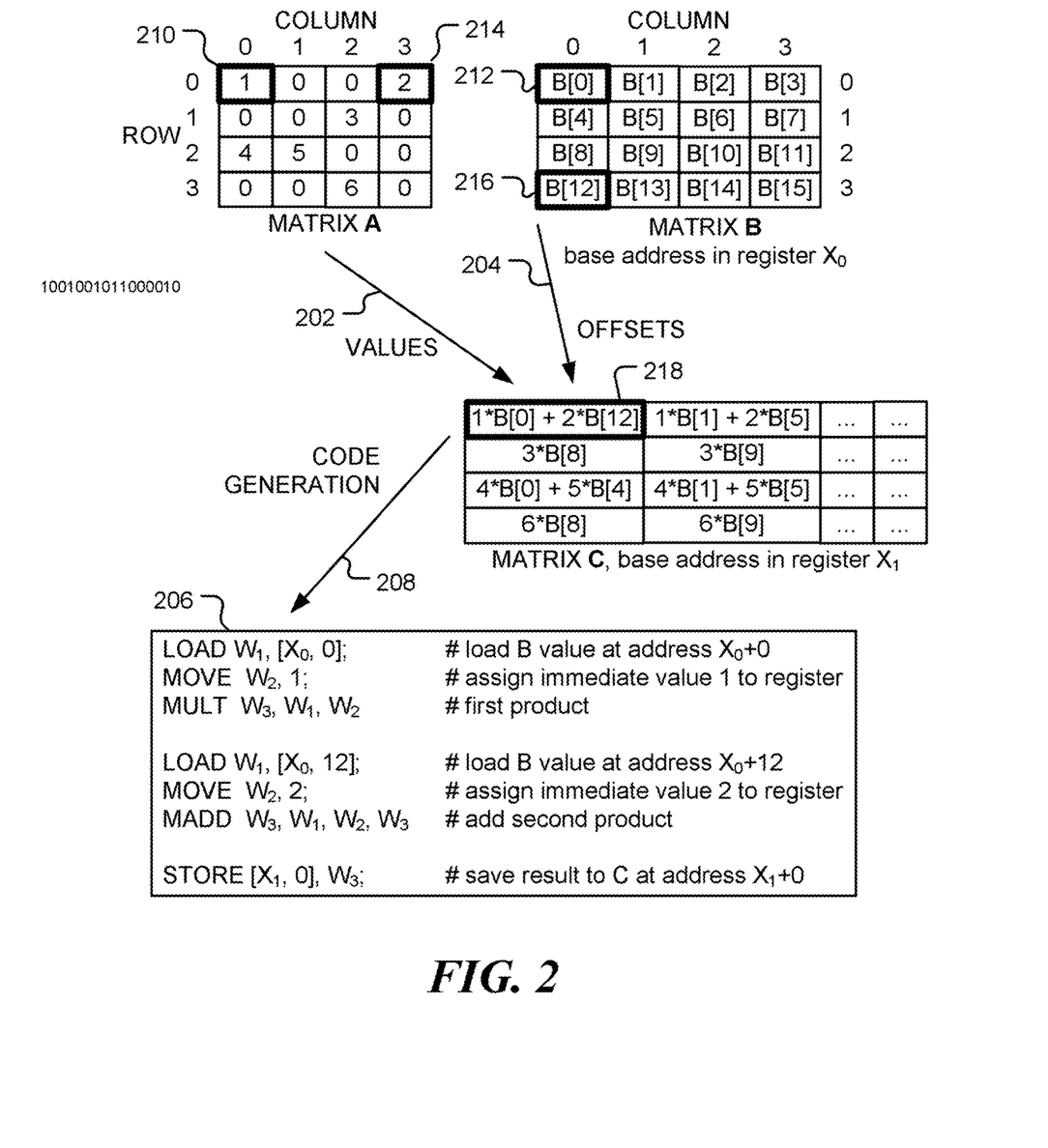
FIG. 2 is a diagrammatic illustration of instruction set generation, in accordance with various representative embodiments.

FIG. 2 is a block diagram illustrating automatic code generation for a simple matrix multiplication. In example shown, the first element of the matrix Y can computed as $$C_{00} = A_{00} B_{00} + A_{03} B_{30}, \qquad (3)$$

since $A_{01}$ and $A_{02}$ are both zero. Using the actual values of the matrix A gives $$C_{00} 1 \times B_{00} + 2 \times B_{30} \qquad (4)$$

The actual values of the matrix B could also be used. However, in many common applications, the matrix A contains filter coefficients or weight values that are applied to multiple matrices B having different values. Assuming the matrices are stored using the same pattern in memory, the elements of B to be used in the computation may be accessed via a base address in memory together with an offset from that base address.

Referring to FIG. 2, computation of an element in the matrix C uses non-zero values 202 from matrix A, together with corresponding memory offsets 204 for the matrix B. These may be obtained in a first stage of processing. From the values and offsets, code 206 is automatically generated, as indicated by arrow 208. Thus, for example, value 210 from matrix A is to be multiplied by the element 212 from matrix B. Similarly, value 214 from matrix A is to be multiplied by the element 216 from matrix B. In the example shown, the elements of matrix B are stored by rows, so the address of element $B_{jk}$ is addr($B_{00}$)+k+j×$N_k$. Thus, $B_{00}$ is stored at offset 0 and $B_{30}$ is stored at offset 12, etc.

In accordance with an embodiment of the disclosure, non-zero values of a first matrix and corresponding memory offsets of a second matrix are identified in a first stage of processing and used to generate, automatically, processing instructions (code) to be used in a processing stage to compute a function of first and second matrices. The function may be a matrix product of the first and second matrices, for example. As a special case, the function may be a scalar product of two vectors. Other functions, such as a matrix sum or difference or Schur product, may be specified. The processing instructions may be used for additional second matrices having the same pattern of storage in memory.

The preprocessing stage uses knowledge of the data values of the sparse matrix A. In one embodiment, the preprocessing stage is performed using 'just-in-time' compilation, executed at run-time. In a further embodiment, the preprocessing stage is performed prior to run-time.

TABLE 1 summarizes the instructions used in the example code 206 in FIG. 2.

TABLE 1

| Instruction | Action |
| --- | --- |
| MOVE $W_d$, x | move the immediate value 'x' into register $W_d$ |
| LOAD $W_d$, [$X_n$, offset] | add offset to base address in register $X_n$ and load the value stored at resulting address into register $W_d$ |
| MULT $W_d$, $W_n$, $W_m$ | load the value $W_n \times W_m$ into register $W_d$ |
| MADD $W_d$, $W_n$, $W_m$, $W_a$ | load the value $W_a + W_n \times W_m$ into register $W_d$ |
| STORE [$X_n$, offset], $W_s$ | add offset to base address in register $X_n$ and store the value in register $W_s$ to memory at the resulting address |

Figure 3:
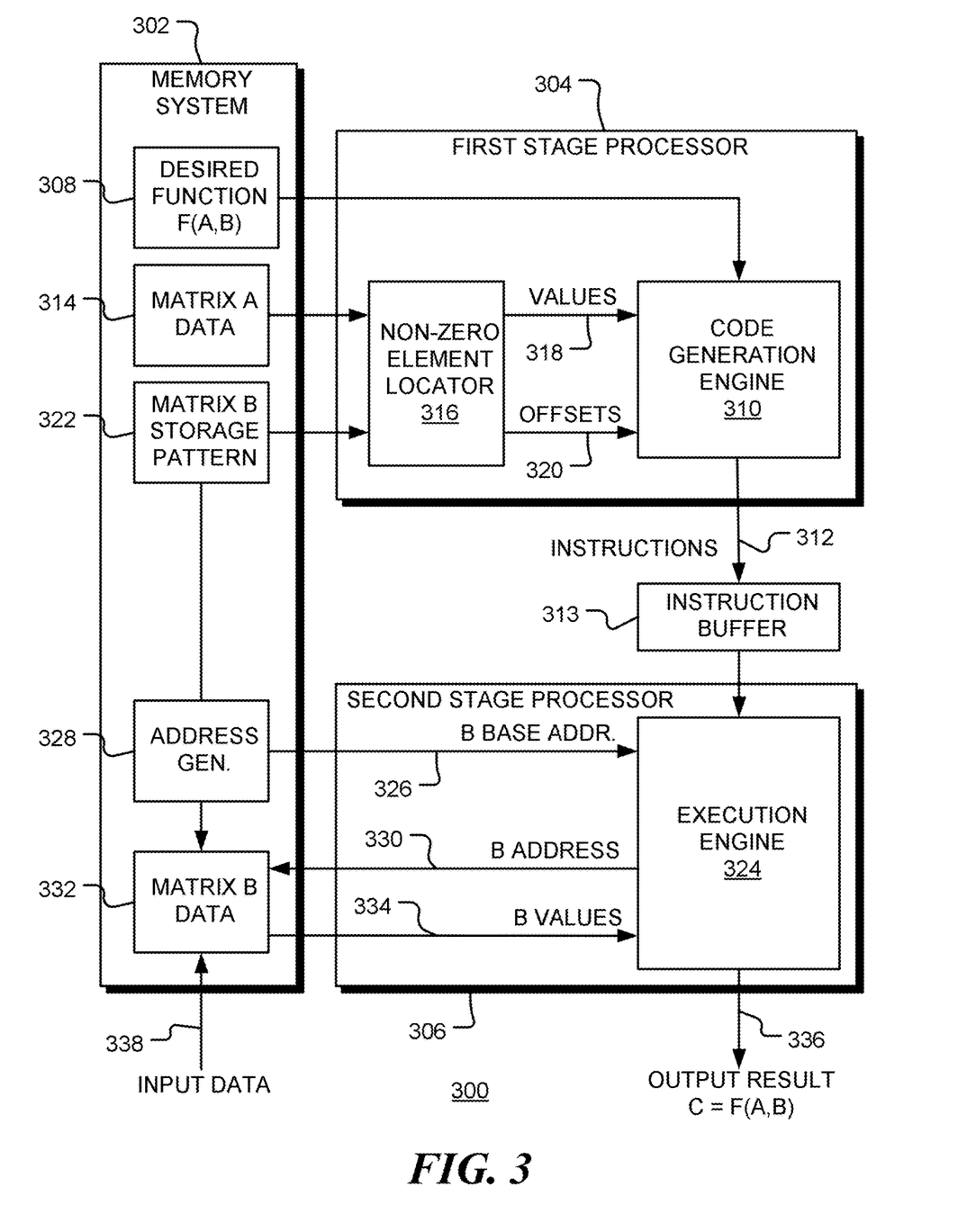
FIG. 3 is a block diagram of a data processing apparatus, in accordance with various representative embodiments.

FIG. 3 is a block diagram of an apparatus 300 for processing sparse data, in accordance with the present disclosure. Apparatus 300 includes memory system 302, first stage processor 304 and second stage processor 306. Apparatus 300 is configured to implement a matrix or vector function F(A, B) of a sparse matrix A and a matrix B. This function may be specified by instructions 308 stored in the memory system. Code generation engine 310 produces a set of instructions 312 that implement the specified function. The set of instructions may be stored in instruction buffer 313. Sparse matrix A is stored in region 314 of memory system 302. First stage processor 304 includes a non-zero element locator 316 that identifies non-zero elements in the matrix A and provides the non-zero elements 318 to code generation engine 310. In addition, non-zero element locator 316 identifies the locations of matrix B that are to be combined with the non-zero elements of A. These locations are identified as offsets 320 from a base address of matrix B. Thus, the storage pattern 322 of the matrix B in memory is used by non-zero element locator 316 to determine the offsets.

As illustrated in box 206 of FIG. 2, the generated instructions contain the explicit non-zero values of matrix A, together offsets of matrix B from a base address (stored in register X0).

Referring again to FIG. 3, execution engine 324 of second stage processor 306 receives generated instructions 312 from first stage processor 304 and, in addition receives a base address 326 for the matrix B from address generator 328. For example, when the instructions 312 implement the multiplication of a column of matrix B by a row of matrix A, a base address may be generated for each successive column of matrix B. In the example shown in FIG. 2, the base address is stored in register X0. Execution of the generated code causes the execution engine 324 to generate addresses 330 of elements in the matrix B (stored in memory region 332), and access values 334. The resulting elements of the matrix C are output at 336.

The matrix B, stored in memory region 332, may be filled by input data 338.

The values of the sparse matrix A are embedded as immediate values in the generated instructions. For example, in one embodiment the values are 8-bit integer values. In this manner, the load operations for the sparse matrix A are entirely eliminated.

In some applications, the function F(A,B) may implemented using a high degree of reuse. For example, for a matrix multiplication a single row of the sparse matrix A is analyzed or parsed once, but the resulting code may be used repeatedly—once for each column of the matrix B.

This, for example, multiplication of matrices A and B, where A is sparse is achieved by hard coding values of the sparse matrix A into a sequence of binary instructions. This may be done at runtime or in a pre-processing step. The non-zero elements of sparse matrix A and corresponding address offsets of data in matrix B are embedded into the instructions as immediate or explicit values.

Following this approach, as illustrated in FIG. 2, a fundamental multiply and accumulate (MAC) operation requires just three instructions:

LOAD $W_1$, [$X_0$, 12]; #load a value from matrix B
MOVE $W_2$, 2; #assign an immediate value (from A) to register
MADD $W_3$, $W_1$, $W_2$, $W_3$ #multiply and accumulate Compared to the conventional approach, which requires at least four instructions, this reduces the number of instructions by 25%, which is equivalent to a speed increase of 33%.

Further potential optimizations are possible, such as replacing the MOVE and MADD instructions by an ADD with shifted register when the immediate value from matrix A is a power of 2.

The overhead of the first stage of processing, described above, is approximately $O(N_i \times N_j)$ when the matrix A has dimensions $N_i \times N_j$. This overhead is small, compared with the computation cost $(N_i \times N_j \times N_k)$ of a full matrix multiplication.

In addition, since the data in the sparse matrix becomes part of the instruction encoding itself, it doesn't go through the caching mechanism in the second stage of processing. This results in better cache utilization.

The approach discussed above may also be used in processors that provide single-instruction, multiple-data (SIMD) instructions.

Figure 4A:
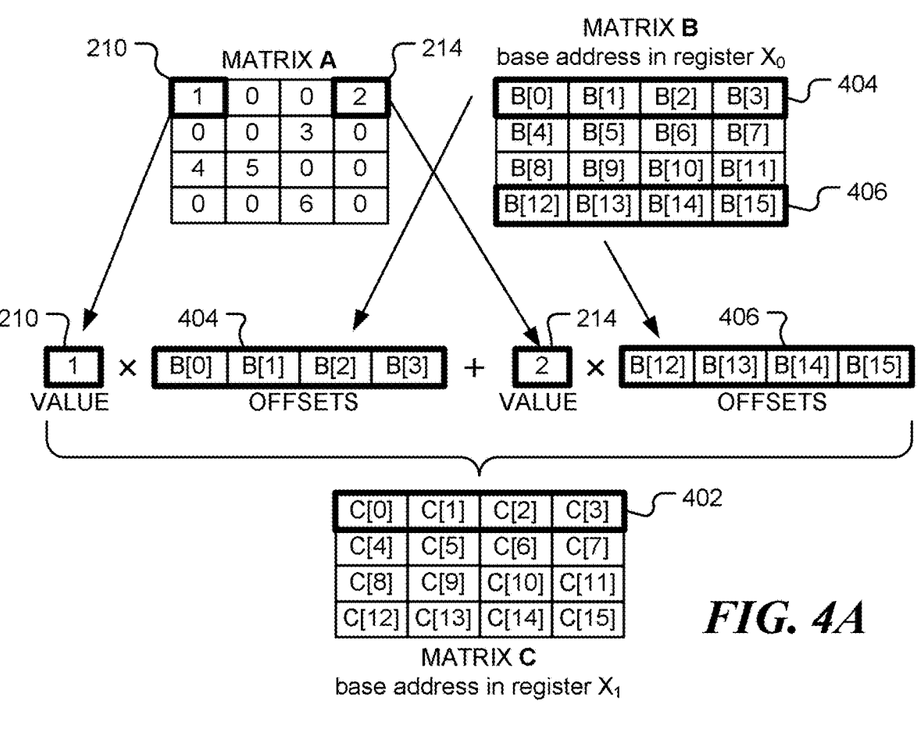
FIGS. 4A and 4B are further diagrammatic illustrations of instruction set generation, in accordance with various representative embodiments.
Figure 4B:
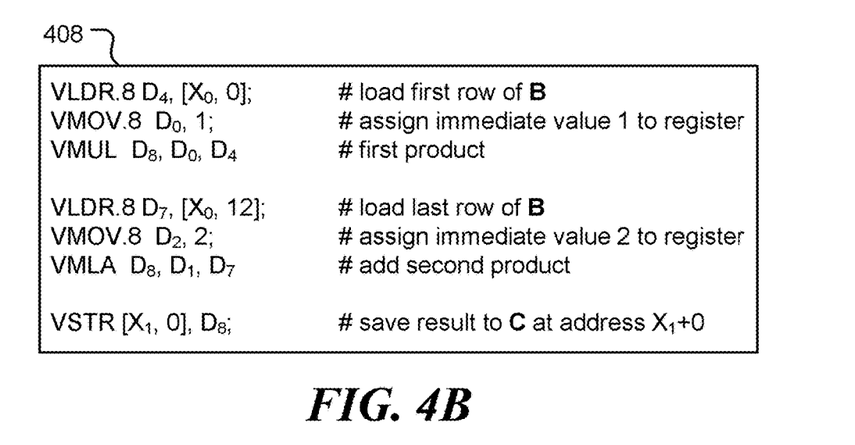

FIGS. 4A and 4B illustrate an example using 4-way vector instructions to compute the first row of the result matrix C. SIMD instructions of other widths may be used, when available. As illustrated in FIG. 4A, the first row 402 of the result matrix C is obtained by multiplying element 210 of the matrix A by the first row 404 of the matrix B and adding the product of element 214 with the last row 406 of the matrix B. The resulting vector instructions are shown in box 408 in FIG. 4B. Note that the register $X_0$ contains the start address of the matrix B. In total, six instructions are generated to compute one row of the result matrix C. Compared to the normal approach, which requires 10 instructions to complete the same task, the instruction count is reduced by 40%.

In an alternative embodiment, an instruction sequence is used that exploits the sparsity of matrix A without use of explicit values of A in the code to be executed. Rather, the locations (rather than the values) of non-zero elements are used to select which code is executed. This may be done by switching between precompiled code dependent upon the locations of non-zero elements. In one embodiment of the alternative embodiment, a bit-vector representation of the sparsity present in matrix A is generated, where each asserted bit position corresponds to a location of a non-zero element. For example, the non-zero elements of the first row of matrix A in FIG. 2 might be indicated by the bit-vector 1001 or the decimal value 9. A set of functions are provided that encapsulate instruction sequences for all possible sparsity patterns of length n. Bits of the sparsity vector are consumed, n bits at a time, and used to direct program flow according to the sparsity pattern found. The corresponding pre-compiled instruction sequence is executed to perform the desired action. For example, with n=8, the sparsity vector is consumed 8 bits at a time, with the 8 bits being used in a switch statement to select one of 256 possible paths corresponding to the 256 pre-compiled functions (one for each possible permutation of the bits).

In this embodiment, the weights (values of the matrix A) are not hardcoded into these more general functions. Instead the MOVE operation for the values is replaced by a LOAD operation. The LOAD operation may specify the offsets for the non-zero elements, in a similar manner to the elements of B. Alternatively, the non-zero weights of matrix A may be packed into a serial weight array and indicated by offsets into that array.

Thus, an embodiment of this method of processor operation comprises identifying memory locations of non-zero elements of a first matrix stored in a memory of the processor, determining memory locations of elements of a second matrix stored in the memory of the processor to be combined with the non-zero elements of the first matrix to produce an element of a third matrix and selecting, by the processor dependent upon the identified memory locations of non-zero elements of a first matrix, a set of processor instructions for combining the non-zero elements of the first matrix with elements of the second matrix at the determined memory locations to produce the element of a third matrix.

An instruction of the set of processor instructions includes an identified memory location of a non-zero element of the first matrix and a determined memory location of an element of the second matrix. The selected set of instructions is then executed by the processor, which causes the processor to access elements of the first and second matrix stored in the memory at the addresses identified in the instructions. An identified memory location of a non-zero element of the first matrix may be designated by a first offset from a first base memory address and a determined memory location of an element of the second matrix comprises a second offset from a second base memory address.

Existing multiply-accumulate instructions, such as the instruction MADD $W_d$, $W_n$, $W_m$, $W_a$ (which encodes $W_d=W_n*W_m+W_a$), typically support only register operands. However, efficiency may be improved still further by providing dedicated extensions to the instruction set architecture (ISA) of a processor.

In one embodiment, an instruction MADD $W_d$, $W_n$, imm, $W_d$ is added to the ISA. This encodes the expression $W_d=W_n*imm+W_a$, where imm is an immediate or explicit value. imm may be an 8-bit or 12-bit signed immediate value, for example.

Using this instruction, the MOVE and MADD instructions (in box 206 in FIG. 2, for example) can be combined into a single instruction. This enables the multiply/accumulate operation to be implement using just two instructions:

LOAD $W_1$, [$X_0$, 12]; #Load a value from matrix B
MADD $W_3$, $W_1$, imm, $W_3$ #Multiply Accumulation with imm from matrix A This represents a 50% reduction in instruction count relative to the normal approach, or a 100% increase in speed.

The instruction may be a single-instruction, single-data (SISD) instruction or a single-instruction, multiple-data (SIMD) instruction in which [$X_0$, 12] refers to a vector.

In a still further embodiment, an ISA is provided where the LOAD, MOVE and MADD instructions are all combined into a single load-scale-add-increment instruction that loads a data element from memory address [Xm+imm12], scales it by an immediate value (multiplies by imm) and then accumulates the result into a destination register $W_d$. For example, the instruction could take the form:

LDR_SC_ACC $W_d$, imm8, [$X_m$, imm 12]

where imm8 is an 8-bit immediate data value imm12 is a 12-bit address offset.

This encodes the expression: $W_d=W_d+imm8*mem[X_m+imm12]$. With this instruction, the 3 instructions (LOAD, MOVE and MADD) are replaced with a single instruction. As a result, the instruction count is reduced by 75%, providing a 300% increase in speed. The instruction may be a SISD instruction or a SIMD instruction, in which [$X_m$, imm12] refers to a vector.

In a multi-processor system, automatic code generation of the type described above may require explicit instruction/data cache invalidation by software if the processor does not support hardware cache coherency. To fully utilize the benefits described above, in which the processor architecture or micro-architecture provides support for fast code generation, the hardware may be configured to enable snooping of the instruction cache. This, in turn, provides support for instruction and/or data-stream coherence. The coherent instruction cache makes the overall flow both faster and simpler. In addition, a coherent instruction cache avoids the risk of coding errors associated with a software managed coherence scheme.

In a further embodiment, the processor is configured to implement LOAD and MOVE instructions in parallel with multiply or multiply/accumulate instructions. For example, the generated code sequence to implement C[0]=1×B[0]+3×B[4]+7×B[12] may be generated as:

LOAD $W_1$, [$X_0$, 0]; MOVE $W_2$, 1; #$W_1$=B[0], $W_2$=1
MULT $W_3$, $W_1$, $W_2$; LOAD $W_1$, [$X_0$, 4]; MOVE $W_2$, 3; #$W_3$=1×B[0],
MADD $W_3$, $W_1$, $W_2$; LOAD $W_1$, [$X_0$, 12]; MOVE $W_2$, 7; #$W_3$=$W_3$+3×B[4]
MADD $W_3$, $W_1$, $W_2$; #$W_3$=$W_3$+7×B[12]

In this example, instructions listed on the same line are performed in parallel. This implementation uses only 4 cycles, compared to 9 cycles using serial LOAD/MOVE/MADD operations.

Figure 5:
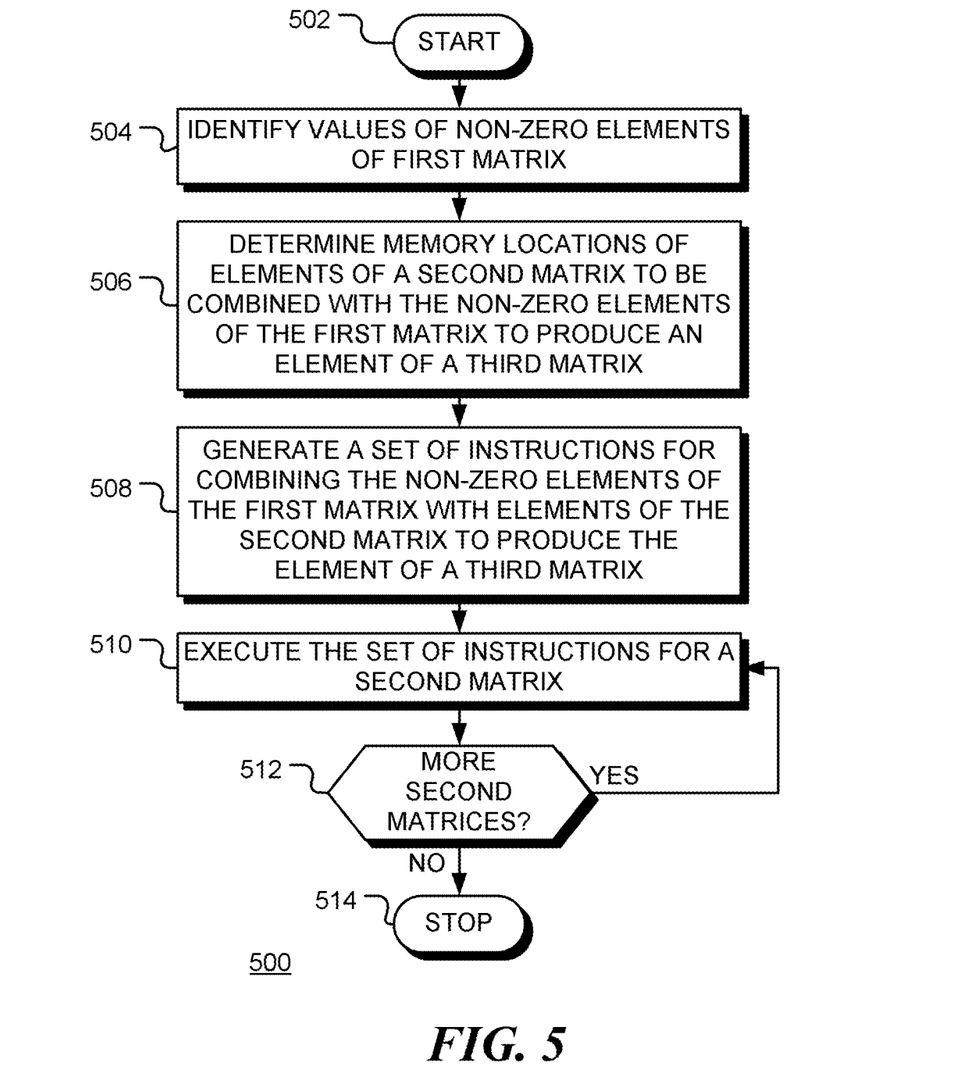
FIG. 5 is a flow chart of a method of data processing, in accordance with various representative embodiments.

FIG. 5 is a flow chart 500 of a method of operation of a processor in accordance with an embodiment. Following start block 502, values of non-zero elements of a first matrix stored in a memory of the processor are identified at block 504. The first matrix (A, say) may be a sparse matrix, for example. At block 506, memory locations are determined of elements of a second matrix (B, say) stored in the memory of the processor to be combined with the non-zero elements of the first matrix to produce an element of a third matrix (C, say). At block 508, a set of processor instructions are generated by the processor for combining the non-zero elements of the first matrix with elements of the second matrix at the determined memory locations to produce the element of a third matrix. The set of processor instructions is executed by the processor, at block 510, for a particular second matrix. An instruction of the set of processor instructions includes a determined memory location in a second matrix and an explicit or immediate value of an identified non-zero element of the first matrix. The determined memory location of an element of the second matrix may be designated in an instruction by an offset from a base memory address. The instruction may also designate a register that stores the base memory address. A value of an identified non-zero element may be embedded in an instruction of the set of processor instructions as an immediate value.

The third matrix may represent a matrix product of the first and second matrices or some other combination of the matrices.

In an embodiment, an instruction of the set of instructions is a single-instruction, multiple-data (SIMD) instruction, that operates on multiple data elements of the second matrix.

The set of instructions may include: (i) a first instruction to move an identified non-zero element of the first matrix into a first register, where the identified non-zero element is embedded in the first instruction as an immediate value, (ii) a second instruction to load a data value stored at a determined address in the second matrix into a first register, and (iii) a third instruction to combine the values in the first and second registers. The third instruction may be a multiplication instruction or a multiply and add instruction, for example.

In a further embodiment, the set of instructions includes: (i) a first instruction to load a data value stored at a determined address in the second matrix into a first register, and (ii) a second instruction to combine the value in the first register with an identified non-zero element of the first matrix, where the identified non-zero element is embedded in the second instruction as an immediate value and where the second instruction comprises a multiplication instruction or a multiply and add instruction.

In a still further embodiment, the set of instructions includes an instruction to combine a data value stored at a determined address in the second matrix with an identified non-zero element of the first matrix, where the identified non-zero element is embedded in the second instruction as an immediate value and where the second instruction comprises a multiplication instruction or a multiply and add instruction.

The identification of values of non-zero elements of the first matrix, determination of memory locations of elements of the second matrix and generation of the set of processor instructions may be performed, by the processor, at a run-time just prior to executing the set of processor instructions. This may be implemented as a 'just-in-time' compilation, for example, that is dependent upon the data in the first matrix. In 'Just-in-time' compilation, also referred as dynamic translation or run-time compilation, instructions of a program (which may be source code or bytecode, for example) are compiled or translated into machine code instructions during execution of the program, i.e. at run-time. This approach has been used previously to enable a source code or bytecode to be executed on processors with different instruction set architectures. In the present disclosure, just-in-time compilation enables the generation of machine code instructions that explicitly include data.

Figure 6:
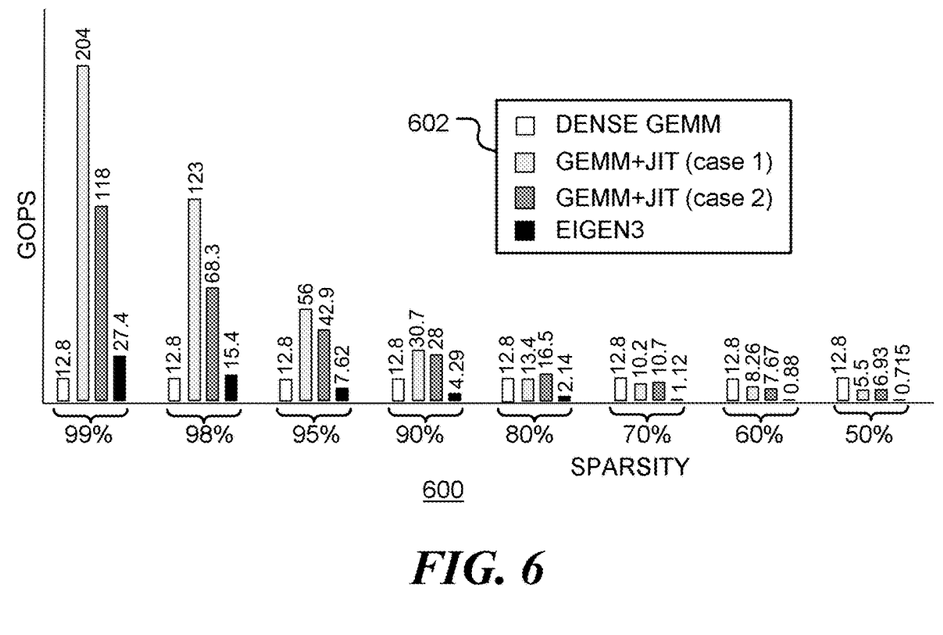
FIG. 6 is a bar chart showing of performance improvements of an example implementation of an embodiment of the disclosed method.

FIG. 6 is a bar chart 600 showing performance improvements of an example implementation of an embodiment of the disclosed method. Bar chart 600 shows the performance chart of a Generalized Matrix Multiplication (GEMM). Each bar in bar chart 600 represents the performance in GOPS (Giga-operations per second) for different degrees of matrix sparsity. For example, at 99% sparsity, 99% of the elements in one of the matrices are zero. In the bar chart, a high level of GOPS denotes better performance. Box 602 indicates the bar colors for different matrix multiplication approaches. The white bars show the performance for a standard GEMM for dense matrices (denoted as 'DENSE GEMM'), which makes no assumption about the values in the matrices. The black bars show the performance for an example open source GEMM library routine for sparse matrices, (denoted as EIGEN3). The light gray and dark gray bars correspond to implementations of the method disclosed above, using just-in-time (JIT) compilation and two different levels of code optimization (denoted as case 1 and case 2). The methods disclosed above outperform others when the sparsity level is between 80% and 99%, based on this benchmark.

In a matrix computation, each column of matrix B is multiplied by each row of sparse matrix A. Columns of matrix B may be loaded once and then reused for multiple rows of matrix A. This avoids loading the same values from memory multiple times. However, this approach may be limited by the number of CPU registers available for holding intermediate data and the size of the L1 instruction cache for holding the generated instructions. In FIG. 6, case 1 generates code for four rows of matrix A at a time, allowing reuse of loaded columns of matrix B, while case 2 generates code for a single row of matrix A at a time.

Those skilled in the art will recognize that the present disclosure has been described in terms of exemplary embodiments based upon use of a programmed processor. The processor may be designed to implement an instruction set architecture that include specific instruction useful for efficient computation of matrix multiplications when at least one of the matrices is sparse. However, the disclosure should not be so limited, since the present disclosure could be implemented using hardware component equivalents such as special purpose hardware and/or dedicated processors which are equivalents to the disclosure as described and claimed. Similarly, general-purpose computers, microprocessor-based computers, micro-controllers, optical computers, analog computers, dedicated processors and/or dedicated hard wired logic may be used to construct alternative equivalent embodiments of the present disclosure. The instruction set architecture of such embodiments may include specific instructions for enhancing performance of matrix computations where at least one of the matrices involved has a degree of sparsity.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

Accordingly, some aspects and features of the disclosed embodiments are set out in the following numbered items:

1. A method of operation of a data processor comprising: receiving a first set of processor instructions for combining a first matrix with a second matrix to produce a third matrix; identifying values of non-zero elements of the first matrix stored in a memory of the data processor; determining memory locations of elements of the second matrix stored in the memory of the data processor to be combined with the non-zero elements of the first matrix to produce an element of the third matrix; generating, by the data processor from the first set of processor instructions, a second set of processor instructions for combining the non-zero elements of the first matrix with elements of the second matrix at the determined memory locations to produce the element of the third matrix; and executing, by the data processor, the second set of processor instructions, where an instruction of the second set of processor instructions includes a determined memory location or a value of an identified non-zero element.

2. The method of item 1, where a determined memory location of an element of the second matrix comprises an offset from a base memory address and where the instruction of the second set of processor instructions includes the base memory address and the offset.

3. The method of item 1, where a value of an identified non-zero element is embedded in an instruction of the second set of processor instructions as an immediate value.

4. The method of item 1, where the third matrix comprises a matrix product of the first and second matrices.

5. The method of item 1, where the first matrix comprises a sparse matrix.

6. The method of item 1, where an instruction of the second set of instructions comprises a single-instruction, multiple-data (SIMD) instruction.

7. The method of item 1, where the second set of instructions comprises: a first instruction to move an identified non-zero element of the first matrix into a first register, where the identified non-zero element is embedded in the first instruction as an immediate value; a second instruction to load a data value stored at a determined address in the second matrix into a second register; and a third instruction to combine the values in the first and second registers.

8. The method of item 7, where the third instruction comprises a multiplication instruction or a multiply and add instruction.

9. The method of item 1, where the second set of instructions comprises: a first instruction to combine values stored in a first register and a second register; a second instruction to move a next identified non-zero element of the first matrix into the first register, where the next identified non-zero element is embedded in the second instruction as an immediate value; and a third instruction to load a next data value stored at a determined address in the second matrix into the second register, where the first, second and third instructions are executed in parallel.

10. The method of item 1, where the second set of instructions comprises: a first instruction to load a data value stored at a determined address in the second matrix into a first register; and a second instruction to combine the value in the first register with an identified non-zero element of the first matrix, where the identified non-zero element is embedded in the second instruction as an immediate value and where the second instruction comprises a multiplication instruction or a multiply and add instruction.

11. The method of item 1, where the second set of instructions comprises: an instruction to combine a data value stored at a determined address in the second matrix with an identified non-zero element of the first matrix, where the identified non-zero element is embedded in the second instruction as an immediate value and where the second instruction comprises a multiplication instruction or a multiply and add instruction.

12. The method of item 1, where identifying values of non-zero elements of the first matrix, determining memory locations of elements of the second matrix and generating the second set of processor instructions from the first set of processor instructions are performed, by the data processor, at a run-time just prior to executing the second set of processor instructions.

13. A method of operation of a data processor comprising: identifying memory locations of non-zero elements of a first matrix stored in a memory of the data processor; determining memory locations of elements of a second matrix stored in the memory of the data processor to be combined with the non-zero elements of the first matrix to produce an element of a third matrix; selecting, by the data processor dependent upon the identified memory locations of non-zero elements of a first matrix, a set of processor instructions for combining the non-zero elements of the first matrix with elements of the second matrix at the determined memory locations to produce the element of a third matrix; and executing, by the data processor, the set of processor instructions, where an instruction of the set of processor instructions includes an identified memory location of non-zero element of the first matrix or a determined memory location of an element of the second matrix.

14. The method of item 13, where an identified memory location of a non-zero element of the first matrix comprises a first offset from a first base memory address and a determined memory location of an element of the second matrix comprises a second offset from a second base memory address.

15. A data processing apparatus comprising: a memory system; a first stage processor, operatively coupled to the memory system and configured to: identify values of non-zero elements of a first matrix stored in the memory; determine memory locations of elements of a second matrix, stored in the memory system, to be combined with the non-zero elements of the first matrix to produce an element of a third matrix; and generate a set of processor instructions for combining the non-zero elements of the first matrix with elements of the second matrix at the determined memory locations to produce the element of a third matrix, where an instruction of the set of processor instructions includes a determined memory location and a value of am identified non-zero element; and a second stage processor, operatively coupled to the memory system and configured to execute the set of processor instructions, where executing the set of processor instructions comprises accessing elements of the second matrix stored in the memory system and producing elements of the third matrix therefrom.

16. The data processing apparatus of item 15, where the first and second stage processors are integrated with each other.

17. The data processing apparatus of item 15, further comprising an instruction buffer, where the first stage processor is configured to generate the set of instructions at a run-time just prior to execution of the set of instructions by the second stage processor.

18. The data processing apparatus of item 15, where a determined memory location of an element of the second matrix comprises an offset from a base memory address and where the instruction of the set of processor instructions includes the base memory address and the offset.

19. The data processing apparatus of item 18, where the second stage processor is configured to execute the set of instructions for each of a plurality of base memory addresses.

20. The data processing apparatus of item 15, where a value of an identified non-zero element is embedded in an instruction of the set of processor instructions as an immediate value.

21. The data processing apparatus of item 15, where an instruction of the set of instructions comprises a single-instruction, multiple-data (SIMD) instruction.

22. The data processing apparatus of item 15, where the set of instructions comprises: a first instruction to load a data value stored at a determined address in the second matrix into a first register; and a second instruction to combine the value in the first register with an identified non-zero element of the first matrix, where the identified non-zero element is embedded in the second instruction as an immediate value and where the second instruction comprises a multiplication instruction or a multiply and add instruction, where the second instruction is implemented in the architecture of the second stage processor.

23. The data processing apparatus of item 22, where the set of instructions comprises: an instruction to combine a data value stored at a determined address in the second matrix with an identified non-zero element of the first matrix, where the identified non-zero element is embedded in the second instruction as an immediate value and where the second instruction comprises a multiplication instruction or a multiply and add instruction, where the second instruction is implemented in the architecture of the second stage processor.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended items.

The invention claimed is:

1. A method of operation of a data processor, comprising:
identifying values of non-zero elements of a first matrix stored in a memory of the data processor;
determining memory locations of corresponding elements of a second matrix, stored in the memory of the data processor, to be multiplied with the non-zero elements of the first matrix to produce a third matrix;
generating, based on the non-zero elements of the first matrix and the corresponding elements of the second matrix at the determined memory locations, a set of processor instructions to produce the third matrix; and
executing the set of processor instructions,
where the set of processor instructions includes at least load instructions including the determined memory locations of the corresponding elements of the second matrix, and multiply-accumulate instructions including the identified non-zero elements of the first matrix and the corresponding elements of the second matrix.

2. The method of claim 1, where each determined memory location of the corresponding elements of the second matrix includes a base memory address and an offset from the base memory address, and where each load instruction includes a base memory address and an offset from the base memory address.

3. The method of claim 2, where each identified non-zero element is embedded in a multiply-accumulate instruction as an immediate value.

4. The method of claim 3, where the load instructions and the multiply-accumulate instructions are combined into load-scale-add-increment instructions, each load-scale-add-increment instruction includes the base memory address, the offset from the base memory address, and the immediate value.

5. The method of claim 1, where the first matrix comprises a sparse matrix.

6. The method of claim 1, where the set of processor instructions includes single-instruction, multiple-data (SIMD) instructions.

7. The method of claim 1, where the set of processor instructions includes move instructions and multiply instructions, where:
each move instruction moves an identified non-zero element of the first matrix into a first register, where the identified non-zero element is embedded in the move instruction as an immediate value;
each load instruction loads a data value stored at a determined memory location in the second matrix into a second register; and
each multiply instruction multiplies the values in the first and second registers to generate a product and stores the product in a third register.

8. The method of claim 7, where the multiply-accumulate instructions multiply the values in the first and second registers to generate the product, add the product to a value stored in the third register to generate a result, and store the result in the third register.

9. The method of claim 1, where the set of processor instructions includes move instructions and multiply instructions, where:
each multiply instruction multiplies values stored in a first register and a second register to generate a product and stores the product in a third register;
each move instruction moves a next identified non-zero element of the first matrix into the first register, where the next identified non-zero element is embedded in the move instruction as an immediate value; and
each load instruction loads a next data value stored at a determined memory location in the second matrix into the second register,
where the multiply, move and load instructions are executed in parallel.

10. The method of claim 1, where:
each load instruction loads data value stored at determined memory location in the second matrix into a first register; and
each multiply-accumulate instruction multiplies the value in the first register with an identified non-zero element of the first matrix, embedded in the multiply-accumulate instruction as an immediate value, to generate a product, adds the product to a value stored in a second register to generate a result, and stores the result in the second register.

11. The method of claim 1, where the load instructions and the multiply-accumulate instructions are combined into load-scale-add-increment instructions, each load-scale-add-increment instruction multiplies a data value stored at a determined memory location in the second matrix with an identified non-zero element of the first matrix to generate a product, adds the product to a value stored in a register to generate a result, and stores the result in the register.

12. The method of claim 1, where said identifying values of non-zero elements of the first matrix, said determining memory locations of the corresponding elements of the second matrix and said generating the set of processor instructions are performed, by the data processor, at a run-time just prior to executing the set of processor instructions.

13. A method of operation of a data processor, comprising:
identifying memory locations of non-zero elements of a first matrix stored in a memory of the data processor;
determining memory locations of corresponding elements of a second matrix, stored in the memory of the data processor, to be multiplied with the non-zero elements of the first matrix to produce a third matrix;
selecting, dependent upon the identified memory locations of non-zero elements of a first matrix, a set of processor instructions for multiplying the non-zero elements of the first matrix with the corresponding elements of the second matrix at the determined memory locations to produce the third matrix; and
executing the set of processor instructions,
where the set of processor instructions includes at least load instructions including the identified memory locations of the non-zero elements of the first matrix, load instructions including the determined memory locations of the corresponding elements of the second matrix, and multiply-accumulate instructions including the non-zero elements of the first matrix and the corresponding elements of the second matrix.

14. The method of claim 13, where an identified memory location of a non-zero element of the first matrix comprises a first base memory address and a first offset from the first base memory address and a determined memory location of a corresponding element of the second matrix comprises a second base memory address and a second offset from the second base memory address.

15. A data processing apparatus, comprising:
a memory;
a first stage processor, coupled to the memory, configured to:
identify values of non-zero elements of a first matrix stored in the memory;
determine memory locations of corresponding elements of a second matrix, stored in the memory, to be multiplied with the non-zero elements of the first matrix to produce a third matrix; and
generate, based on the non-zero elements of the first matrix and the corresponding elements of the second matrix at the determined memory locations, a set of processor instructions to produce the third matrix; and
a second stage processor, coupled to the memory, configured to execute the set of processor instructions,
where the set of processor instructions includes at least load instructions including the determined memory locations of the corresponding elements of the second matrix, and multiply-accumulate instructions including the identified non-zero elements of the first matrix and the corresponding elements of the second matrix.

16. The data processing apparatus of claim 15, where the first and second stage processors are integrated with each other.

17. The data processing apparatus of claim 15, further comprising an instruction buffer coupled to the first stage processor and the second stage processor, where the first stage processor is configured to generate the set of processor instructions at a run-time just prior to execution of the set of processor instructions by the second stage processor.

18. The data processing apparatus of claim 15, where each determined memory location of the corresponding elements of the second matrix includes a base memory address and an offset from the base memory address, and where each load instruction includes a base memory address and an offset from the base memory address.

19. The data processing apparatus of claim 18, where the second stage processor is configured to execute the set of processor instructions for each of a plurality of base memory addresses.

20. The data processing apparatus of claim 18, where each identified non-zero element of the first matrix is embedded in a multiply-accumulate instruction as an immediate value.

21. The data processing apparatus of claim 20, where the load instructions and the multiply-accumulate instructions are combined into load-scale-add-increment instructions, each load-scale-add-increment instruction multiplies a data value stored at a determined memory location in the second matrix with an identified non-zero element of the first matrix to generate a product, adds the product to a value stored in a register to generate a result, and stores the result in the register.

22. The data processing apparatus of claim 15, where the set of processor instructions includes single-instruction, multiple-data (SIMD) instructions.

23. The data processing apparatus of claim 15, where:
each load instruction loads a data value stored at a determined memory location in the second matrix into a first register; and
each multiply-accumulate instruction multiplies the value in the first register with an identified non-zero element of the first matrix, embedded in the multiply-accumulate instruction as an immediate value, to generate a product, adds the product to a value stored in a second register to generate a result, and stores the result in the second register.

* * * * *